United States Patent Office 2,935,537
Patented May 3, 1960

2,935,537

PROCESS FOR THE STABILISATION OF CHLORINATED HYDROCARBONS

Nestor Daras, Ixelles-Brussels, Belgium, assignor to Solvay & Cie, Brussels, Belgium, a Belgian company No Drawing. Application November 4, 1958
Serial No. 771,754

Claims priority, application Belgium November 9, 1957

12 Claims. (Cl. 260—652.5)

The present invention relates to a process for the stabilisation of chlorinated hydrocarbons, particularly trichlorethylene and perchlorethylene, with a view of preventing the decomposition of these products and the simultaneous formation of acid during storage or in use.

It is known that by the action of heat and oxygen, chlorinated hydrocarbons undergo an oxidation which is catalysed by various agents such as light and certain metal salts, particularly iron, aluminium and magnesium salts.

In order to retard this oxidation, it has been proposed to add to these chlorinated hydrocarbons small quantities of various products such as alcohols, inorganic or organic basic products, phenols, epoxy compounds etc.

It is especially known that the simultaneous addition of an alcohol and certain amines imparts to trichlorethylene a good stability to daylight.

However effective these stabilisers may be for obviating the oxidation of chlorinated hydrocarbons, they are, in general, incapable of preventing a rapid decomposition of said chlorinated hydrocarbons in the course of their use for the degreasing of light metals, particularly aluminium and its alloys.

The decomposition of chlorinated hydrocarbons in contact with aluminium, particularly of trichlorethylene, appears, in fact, to be different from the decomposition resulting from a simple oxidation by atmospheric oxygen. It is probable that catalytic polymerisation reactions are started by aluminium chloride resulting from the aluminium being attacked by hydrochloric acid or phosgene both formed by the oxidation of the chlorinated hydrocarbons.

This decomposition becomes generally apparent by a sudden increase in acidity of the product which becomes black and is transformed into a tarry black mass with the evolution of a large amount of heat.

As has been indicated above, phenols have been added to chlorinated hydrocarbons on account of their anti-oxidising properties. The epoxy compounds have likewise been added on account of their fitness for fixing hydrogen chloride and metal chlorides. It has now been found that the simultaneous addition of some of these inhibiting compounds has a synergistic effect against the decomposition of chlorinated hydrocarbons.

According to the invention, chlorinated hydrocarbons, particularly trichlorethylene and perchlorethylene, are stabilised by the addition of small quantities of phenol and of an epoxy compound.

Among the phenolic componds, only phenol has the property of having a marked synergistic effect when used together with epoxy compounds. Other phenolic compounds such as thymol and cresols do not promote any action. The invention is therefore not based on a simple and general combination of an anti-oxidising compound and a fixing agent for hydrochloric acid or for metal chlorides. On the other hand, all epoxy compounds seem to activate the inhibitive action of phenol.

The stabilising action of various compounds used for improving the resistance to decomposition of chlorinated hydrocarbons is demonstrated by an accelerated laboratory test which is carried out as follows:

150 cc. of, for example trichlorethylene and a test piece of aluminium are placed in a 300 cc. flask of a Soxhlet extracting apparatus fitted with an extractor of 65 cc. capacity. The flask is electrically heated and the trichlorethylene is rapidly brought to the boil under reflux at a constant speed while an oxygen stream is passed through the apparatus which is illuminated by a fluorescent lamp of the "blue actinic" type. During the whole duration of the test, the speed of evolution of acid vapours at the outlet of the apparatus is measured. This speed which is very low at the start becomes suddenly very high whilst the trichlorethylene turns black and is transformed into a tarry black mass. The resistance of trichlorethylene to the test is measured by the time, expressed in hours, counted from the start of the test, i.e. when the sample is brought to the boil, to the instant where the evolution of acid suddenly becomes very rapid and exceeds $15.10^{-3}$ mol gr./h.

The following table shows the resistance to decomposition of un-stabilised trichlorethylene and of trichlorethylene stabilised with various phenolic and/or epoxy compounds.

Table 1

| Test No. | Stabilising substances, mg./litre | Resistance in the accelerated test, hours |
|---|---|---|
| 1 | nil | 22 |
| 2 | phenol (200) | 95 |
| 3 | o-cresol (200) | 130 |
| 4 | thymol (100) | 35 |
| 5 | epichlorhydrin (1500) | 87 |
| 6 | butylene oxide (1500) | 82 |
| 7 | phenol (200)—epichlorhydrin (1500) | 294 |
| 8 | phenol (200)—butylene oxide (1500) | 287 |
| 9 | phenol (200)—epichlorhydrin (5000) | 328 |
| 10 | thymol (100)—epichlorhydrin (5000) | 82 |
| 11 | o-cresol (200)—epichlorhydrin (1500) | 218 |

The results of the test listed in Table I show that a synergistic action is obtained by combining, according to the process of the invention, the stabilising action of epoxy compounds with that of phenol. In the case of other phenol derivatives such as cresol (test 11) and thymol (test 10), the stabilising action of the two compounds is simply cumulative or even inferior to the sum of the stabilising actions of each of the constituents (test 10).

The amounts of stabilising matter to be used are generally comprised between 0.05 and 0.5 g./litre of phenol and between 0.5 to 10 g./litre of epoxy compound. However, the most advantageous proportions appear to be 0.1 to 0.2 g. of phenol and 1.5 to 5 g. of epoxy compound per litre of chlorinated hydrocarbon to be stabilised.

The combined action of phenol and an epoxy compound such as epichlorhydrin already permits a resistance of more than 300 hours to be obtained in the accelerated laboratory test described above.

It has also been found that the resistance of chlorinated hydrocarbons to thermic decomposition by the action of light metals, oxygen and light may be appreciably further increased by adding small quantities of aniline, pyrrole or its derivatives to the stabilising compounds based on phenol and an epoxy compound. The addition of 50 to 500 mg. of these additional compounds per litre of chlorinated hydrocarbon to be stabilised permits a strong increase of the resistance. Lower or higher concentrations may however also be used. The effect of additional compounds such as aniline or pyrroles is surprising. By combining the action of amines with that of epoxy compounds, particularly epichlorhydrin, there is in fact obtained in the accelerated laboratory test a resistance which is very low as appears from the tests listed in the following table. The combined action of pyrrole and epichlorhydrin likewise gives only a very low test resistance which does not correspond to the additive action of each compound taken individually. Incidentally, the addition of amines other than aniline to stabilising mixtures of phenol and epoxy compounds has the effect of reducing the test resistance. This is particularly the case if piperidine, cyclohexylamine or morpholine are used as an amine.

The following Table II shows the resistance to decomposition of un-stabilised trichlorethylene and of trichlorethylene stabilised by various compounds or combinations thereof.

Table II

| Test No. | Stabilising substances, mg./litre | Resistance in the accelerated test, hours |
|---|---|---|
| 1 | nil | 22 |
| 2 | epichlorohydrin (1500) | 87 |
| 3 | epichlorhydrin (1500)+triethylamine (200) | 45 |
| 4 | epichlorhydrin (1500)+cyclohexylamine (200) | 50 |
| 5 | epichlorhydrin (1500)+methoxypropylamine (200) | 35 |
| 6 | epichlorhydrin (1500)+thiazole (200) | 37 |
| 7 | epichlorhydrin (1500)+piperidine (200) | 48 |
| 8 | epichlorhydrin (1500)+aniline (200) | 60 |
| 9 | epichlorhydrin (1500)+dimethoxypropylamine (200) | 62 |
| 10 | pyrrole (200) | 164 |
| 11 | epichlorhydrin (1500)+pyrrole (200) | 174 |
| 12 | epichlorhydrin (1500)+phenol (200) | 294 |
| 13 | epichlorhydrin (5000)+phenol (200) | 328 |
| 14 | epichlorhydrin (1500)+phenol (200)+pyrrole (200) | 345 |
| 15 | epichlorhydrin (1500)+phenol (200)+aniline (200) | 448 |
| 16 | epichlorhydrin (3000)+phenol (200)+aniline (200) | 504 |
| 17 | epichlorhydrin (1500)+phenol (200)+piperidine (200) | 212 |
| 18 | epichlorhydrin (1500)+phenol (200)+cyclohexylamine (200) | 114 |
| 19 | epichlorhydrin (1500)+phenol (200)+morpholine (200) | 160 |

The tests 1 to 11 listed in the Table II show that combinations of amines or of pyrrole with epichlorhydrin stabilise trichlorethylene unsatisfactorily. The resistance in the accelerated test is inferior to that obtained with epichlorhydrin alone in the case where it is combined with amines; the results are not even additive in the case of pyrrole.

Tests 12 and 13 show the noticeable improvement in the test resistance of the samples stabilised by mixtures of phenol and epoxy compounds.

Tests 14, 15 and 16 show a further improvement of the resistance obtained by combining aniline or pyrrole with compositions containing phenol and an epoxy compound.

Finally, tests 17, 18 and 19 show, on the contrary, that piperidine, cyclohexylamine and morpholine cannot replace aniline, since these azotized compounds have the effect of reducing the efficiency of stabilisers based on phenol and an epoxy compound.

Although stabilising compounds based on phenol, an epoxy compound and, possibily, aniline, pyrrole or a pyrrole derivative are particularly effective in the stabilisation of trichlorethylene, they may also be used for the stabilisation of perchlorethylene and other chlorinated hydrocarbons such as carbon tetrachloride, dichlorethane, trichlorethane, etc.

I claim:

1. A process for the stabilization of a chlorinated hydrocarbon which comprises supplying thereto phenol and a member of the group consisting of epichlorhydrin and butylene oxide.

2. A process for the stabilization of a chlorinated hydrocarbon which comprises supplying thereto phenol, a member of the group consisting of epichlorhydrin and butylene oxide, and a member of the group consisting of aniline and pyrrole.

3. A process for the stabilization of a chlorinated hydrocarbon which comprises supplying thereto 0.05 to 0.5 g. of phenol and 0.5 to 10 g. of a member of the group consisting of epichlorhydrin and butylene oxide per liter of said chlorinated hydrocarbon.

4. A process for the stabilization of a chlorinated hydrocarbon which comprises supplying thereto 0.05 to 0.5 g. of phenol, 0.5 to 10 g. of a member of the group consisting of epichlorhydrin and butylene oxide, and 0.05 to 0.5 g. of a member of the group consisting of aniline and pyrrole per liter of said chlorinated hydrocarbon.

5. A process for the stabilization of a chlorinated hydrocarbon which comprises supplying thereto phenol and epichlorhydrin.

6. A process for the stabilization of trichlorethylene which comprises supplying thereto phenol and a member of the group consisting of epichlorhydrin and butylene oxide.

7. A composition of matter comprising a chlorinated hydrocarbon, phenol and a member of the group consisting of epichlorhydrin and butylene oxide.

8. A composition of matter comprising a chlorinated hydrocarbon, phenol, a member of the group consisting of epichlorhydrin and butylene oxide, and a member of the group consisting of aniline and pyrrole.

9. A composition of matter comprising a chlorinated hydrocarbon, 0.05 to 0.5 g. of phenol and 0.5 to 10 g. of a member of the group consisting of epichlorhydrin and butylene oxide per liter of said chlorinated hydrocarbon.

10. A composition of matter comprising a chlorinated hydrocarbon, 0.05 to 0.5 g. of phenol, 0.5 to 10 g. of a member of the group consisting of epichlorhydrin and butylene oxide and 0.05 to 0.5 g. of a member of the group consisting of aniline and pyrrole per liter of said chlorinated hydrocarbon.

11. A composition of matter comprising a chlorinated hydrocarbon, phenol, and a member of the group consisting of epichlorhydrin and butylene oxide.

12. A composition of matter comprising trichlorethylene, phenol, and a member of the group consisting of epichlorhydrin and butylene oxide.

References Cited in the file of this patent

UNITED STATES PATENTS

| 2,797,250 | Copelin | June 25, 1957 |
| 2,818,446 | Starks | Dec. 31, 1957 |

FOREIGN PATENTS

| 787,726 | Great Britain | Dec. 11, 1957 |
| 1,161,469 | France | Sept. 11, 1958 |